(12) United States Patent
Brown

(10) Patent No.: US 7,890,302 B2
(45) Date of Patent: Feb. 15, 2011

(54) DISTRIBUTED IMAGING ARRAY SYSTEM

(75) Inventor: Stephen J. Brown, Woodside, CA (US)

(73) Assignee: Health Hero Network, Inc., Palo Alto, CA (US)

( * ) Notice: Subject to any disclaimer, the term of this patent is extended or adjusted under 35 U.S.C. 154(b) by 510 days.

(21) Appl. No.: 12/047,443

(22) Filed: Mar. 13, 2008

(65) Prior Publication Data

US 2009/0231695 A1 Sep. 17, 2009

(51) Int. Cl.
*G05B 15/00* (2006.01)
*G06F 19/00* (2006.01)
*G06F 17/40* (2006.01)

(52) U.S. Cl. .......................... 702/188; 702/187; 713/1; 713/100

(58) Field of Classification Search .................... 73/1.1, 73/170.16, 432.1, 865.8, 865.9; 340/500, 340/540, 600, 601, 870.01, 870.07; 382/100, 382/354, 376, 309; 702/1, 2, 85, 104, 127, 702/187, 188, 189; 713/1, 100
See application file for complete search history.

(56) References Cited

U.S. PATENT DOCUMENTS

| | | | | |
|---|---|---|---|---|
| 3,471,856 A | * | 10/1969 | Hollenbaugh et al. | 342/50 |
| 3,534,337 A | * | 10/1970 | Helmut et al. | 702/188 |
| 6,023,223 A | * | 2/2000 | Baxter, Jr. | 340/531 |
| 6,028,300 A | | 2/2000 | Rhoads et al. | |
| 6,084,870 A | * | 7/2000 | Wooten et al. | 370/349 |
| 6,085,152 A | * | 7/2000 | Doerfel | 702/3 |
| 6,160,993 A | * | 12/2000 | Wilson | 455/12.1 |
| 6,208,938 B1 | * | 3/2001 | Doerfel | 702/3 |
| 6,292,724 B1 | * | 9/2001 | Apsell et al. | 701/29 |
| 6,317,029 B1 | * | 11/2001 | Fleeter | 340/10.32 |
| 6,836,726 B2 | * | 12/2004 | Sanchez Peiro | 701/207 |
| 6,847,892 B2 | | 1/2005 | Zhou et al. | |
| 6,950,552 B2 | | 9/2005 | Nair et al. | |
| 7,092,156 B2 | * | 8/2006 | Baun et al. | 359/430 |
| 7,672,262 B2 | * | 3/2010 | McCoy et al. | 370/316 |
| 2002/0064763 A1 | * | 5/2002 | Aoyama | 434/142 |
| 2002/0070333 A1 | | 6/2002 | Rhoads et al. | |
| 2004/0047036 A1 | | 3/2004 | Baun et al. | |
| 2004/0068365 A1 | * | 4/2004 | Sanchez Peiro | 701/207 |
| 2006/0092508 A1 | | 5/2006 | Baun et al. | |
| 2006/0103926 A1 | | 5/2006 | Meyers et al. | |
| 2006/0229810 A1 | | 10/2006 | Cross et al. | |

FOREIGN PATENT DOCUMENTS

| | | |
|---|---|---|
| CN | 1693846 | 11/2005 |
| EP | 1640760 | 3/2006 |

* cited by examiner

*Primary Examiner*—Edward R Cosimano
(74) *Attorney, Agent, or Firm*—Rahman LLC

(57) ABSTRACT

A system, apparatus, and method for astronomical activity monitoring and imaging using a plurality of distributed remotely-reprogrammable observing devices communicating with a server, and providing astronomical activity monitoring and imaging information. In one embodiment the observing devices may also have sensors coupled to provide atmospheric data that further characterizes the astronomical activity monitoring and imaging information. Furthermore, remote reprogramming of observing device by broadcast data transmitted by a satellite is provided.

24 Claims, 5 Drawing Sheets

DISTRIBUTED IMAGING ARRAY SYSTEM

BACKGROUND

1. Technical Field

The embodiments herein relate generally to the aggregation of images captured remotely and, more particularly to, astronomical imaging using distributed observing devices.

2. Description of the Related Art

Astronomical imaging holds great importance in astronomical studies by contributing to a better understanding of the entities observed in the universe. Also, improved observation techniques help in observing and pre-determining a happening in space. Generally, the observing or imaging means used in observing the universe at a scale of interest to research are complex. The cost associated with such complex equipment makes astronomical imaging limited to research centers. Public use of limited data may be allowed by some research centers. Also, satellite borne imaging projects have been launched in the past which may be expensive and may have long development times so that they tend to be obsolete by the time they are completed.

Recently, Internet communities have been formed that allow users to report astronomical events. Such communities may also coach users on observing specific events and later confirm observed findings. Also, amateur telescopes are programmable with coordinates or calibrated by pointing to specific stars. These telescopes may also receive date, time and global positioning system (GPS) location signals via satellite. U.S. Pat. No. 7,092,156, the complete disclosure of which, in its entirety, is herein incorporated by reference, describes one such telescope system and more particularly describes a fully automated telescope system that is able to be fully operable in both Alt-Az and polar configurations. In either configuration, the telescope aligns itself to the celestial coordinate system following a simplified initialization procedure during which the telescope tube is first pointed north and then pointed towards a user's horizon. A command processor, under application software program control orients the telescope system with respect to the celestial coordinate system given the initial directional inputs. The initial telescope orientation may be further refined by initially inputting a geographical location indicia, or by shooting one or two additional celestial objects. Once the telescope's orientation with respect to the celestial coordinate system is established, the telescope system will automatically move to and track any desired celestial object without further alignment by a user.

Another astronomical observation technique may use multiple distributed antennas to receive radio signals. The radio signals received from multiple antennas may be combined to create a radio image whose resolution may be higher owing to distributed antennas' inputs. However, such techniques may require special equipment and setup. The image formation using radio signals may require complex analysis, which may make the overall cost associated high.

Furthermore, telescope arrays have been proposed that may combine photonic data from multiple telescopes through intensity interferometry imaging. U.S. Pat. No. 6,028,300, the complete disclosure of which, in its entirety, is herein incorporated by reference, describes one such imaging instrument, and more particularly discloses an imaging instrument, which includes plural spaced-apart photon collectors, positioned so that radiation from a remote source arrives at different times at different of the collectors. A digitizing sampler creates a time-based record of signal received at each collector. By correlating, the sampled data from the different collectors, an image of the source can be constructed. Other configurations provide optical fibers each having a first end movable within the focal point of a collector and a second end that is combined with second ends of other fibers so as to provide an imaged output.

However, these astronomical systems and instruments available may be expensive and complex. This restricts a holistic study using astronomical imaging. Also, individual researchers working on astronomical imaging projects may be restricted to limited data. Therefore, there is a requirement of an enhanced, yet cost-effective system for performing astronomical observations.

SUMMARY

The embodiments herein provide a system, apparatus, and method for astronomical activity monitoring and imaging. In one embodiment a plurality of distributed remotely reprogrammable observing devices are provided that are configured to receive broadcast data and be accordingly reprogrammed. Users of the observing device are allowed to determine a configuration for the observing device. The information collected from the plurality of observing devices may be made available and processed at a server. The server may also generate broadcast data based on the processing of such information that instructs various observing devices to participate in astronomical activity monitoring and imaging. The observing devices may also have sensors coupled to provide atmospheric data that further characterizes the information received. Such atmospheric data may also be used for recalibration.

In another embodiment, a user interface in the observing device is provided that allows aggregation of information. Surveys generated at the server may allow users to confirm certain astronomical activity or event thereby providing accurate information. The information available at the server may be made available to various users. Remote service access devices may be provided that connect to the server for accessing such information. Restriction on information access may also be provided in the server.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF THE PREFERRED EMBODIMENTS

Figure 1:
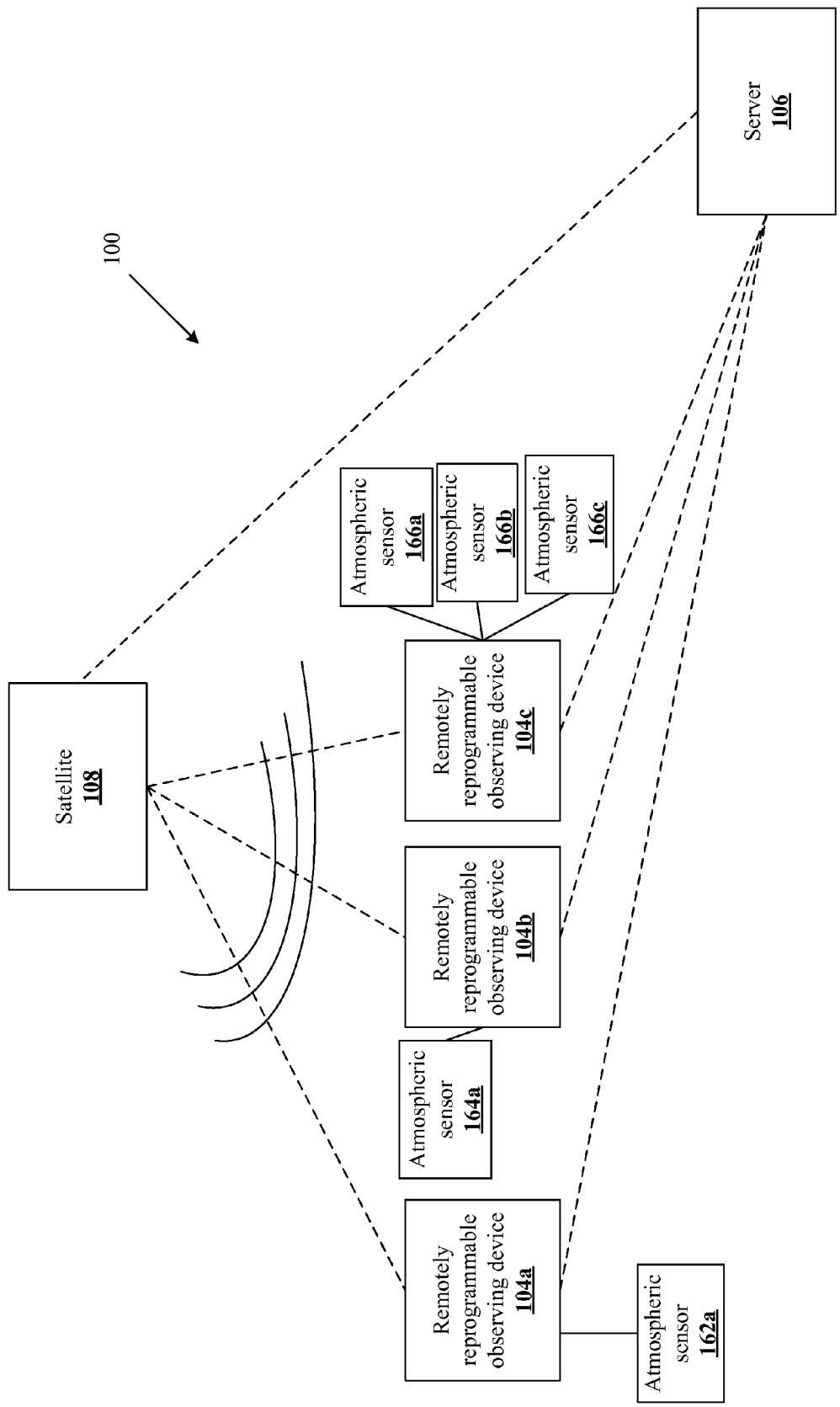
FIG. 1 is a block diagram illustrating an astronomical activity monitoring and imaging system according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for an enhanced, yet cost-effective system for performing astronomical observations. The embodiments herein achieve this by providing a system, apparatus, and method for astronomical activity monitoring and imaging. In one embodiment, a plurality of distributed remotely-reprogrammable observing devices communicate with a server, providing astronomical activity monitoring and imaging information. The server is adapted to process the information and transmit broadcast data to a satellite. Each observing device is reprogrammed by the broadcast data based on user configurations. One aspect of the embodiments herein provides atmospheric data to the observing device. The data may then be used to recalibrate the astronomical activity monitoring and imaging information. In another embodiment, the astronomical activity monitoring and imaging information obtained from the observing devices is processed to generate improved information using image interferometry. Referring now to the drawings, and more particularly to FIGS. 1 through 5, where similar reference characters denote corresponding features consistently throughout the figures, there are shown preferred embodiments.

FIG. 1 illustrates a general block diagram of an astronomical activity monitoring and imaging system 100 according to one embodiment herein. The system 100 includes a plurality of observing devices 104a-104c, which may monitor and capture astronomical images or images of an astronomical activity being observed. Each observing device 104a-104c may have an atmospheric sensor 162a (or a plurality of sensors) coupled to it. In one embodiment, atmospheric sensor 162a may be coupled to the observing device 104a. The observing device 104b has atmospheric sensor 164a coupled to it, and the observing device 104c has atmospheric sensors 166a-166c coupled to it. The atmospheric sensors 162a, 164a, 166a-166c provide atmospheric data that affects the astronomical activity monitoring and imaging information such as, for example, temperature, wind direction, etc.

The plurality of observing devices 104a-104c may be placed at distant geographical locations. Alternatively, the observing devices 104a-104c may also be placed in close geographical area such as, for example, research observatories. Each of the observing devices 104a-104c may be adapted to communicate with a server 106 that receives the astronomical activity and imaging information from the various observing devices 104a-104c. In one embodiment, this communication between the observing devices 104a-104c and the server 106 may take place using a wireless data network.

The server 106 processes the astronomical activity and imaging information obtained from the various observing devices 104a-104c. Based on a rule-set the server 106 may transmit broadcast data to a satellite 108. For example, broadcast data may be produced if the number of observing devices 104a-104c providing information on an astronomical activity and imaging is greater than a prefixed number. The satellite 108 is adapted to transmit the broadcast data back to the observing devices 104a-104c thereby providing a closed loop control system for monitoring astronomical observations. The broadcast data received from the server 106 may be reformatted or modified before being transmitted by the satellite 108.

Again, the plurality of distributed remotely reprogrammable observing devices 104a-104c are adapted to receive the broadcast data transmitted by the satellite 108. Each observing device 104a-104c may be configured independently, based on user configurations, to receive the broadcast data. For example, the user configurations of the observing device 104a may allow receiving of broadcast data during specified time periods or atmospheric conditions.

The observing devices 104a-104c, on receiving the broadcast data, may be reprogrammed to observe or capture a particular astronomical activity and imaging information. Each of the observing devices 104a-104c may capture the same astronomical activity from different locations, therefore providing various views of the same astronomical activity. Also, the atmospheric data associated with each of the observing devices 104c-104c may be different.

Figure 2:
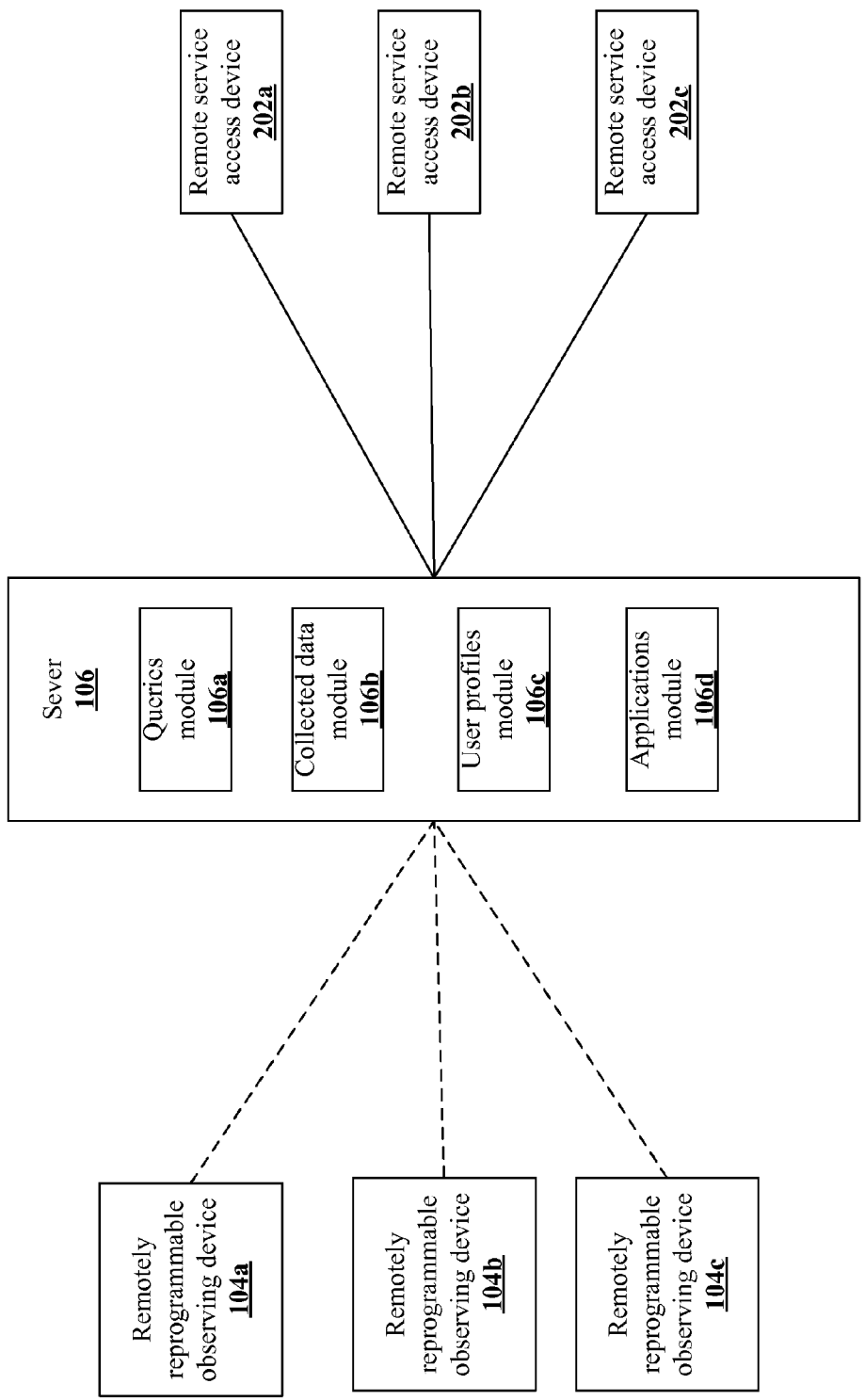
FIG. 2 is a block diagram illustrating server communication according to an embodiment herein.

FIG. 2 illustrates the server 106 (of FIG. 1) receiving astronomical activity and imaging information from the observing devices 104a-104c (of FIG. 1). The server 106 may process the astronomical activity and imaging information obtained from the observing devices 104a-104c to generate an improved information set. The improved information is therefore richer in information with improved image quality. Furthermore, the improved information may be made accessible by a remote service access device 202a. In one embodiment, a plurality of remote service access devices 202a-202c may access the improved information through the World Wide Web.

The server 106 may comprise a plurality of storage devices (not shown) and applications (modules 106a-106d) to process and store the data and information obtained. In one embodiment, the server 106 may store queries generated by various remote service access devices 202a-202c in a queries module 106a. Furthermore, the server may comprise a collected data module 106b, which may be used for processing a result of a query. Timely received astronomical activity and imaging information may be stored in the collected data module 106b.

Accessibility and other user configuration of each of the observing devices 104a-104c and the remote service access devices 202a-202c may be stored in a user profiles module 106c. This enables selected data access to the remote service access devices 202a-202c. Also, the users of the observing devices 104a-104c may decide which astronomical activity and imaging information that may be shared using the user profile module 106c.

An application module 106d may comprise of various applications, which may be used for the processing of astronomical activity and imaging information. For example, an application can use image-interferometry to combine astronomical activity and imaging information obtained from various observing devices to produce improved information.

Figure 3:
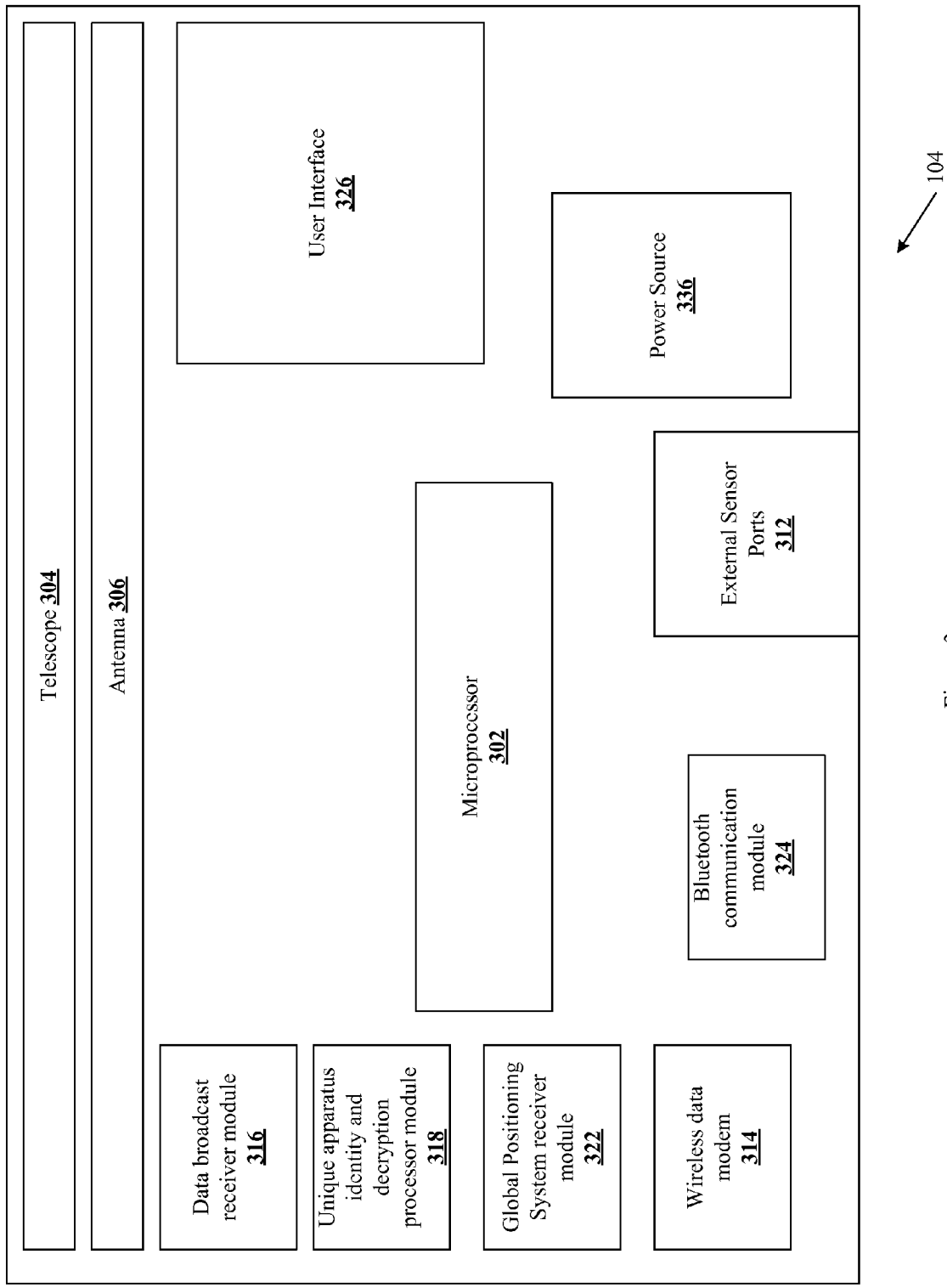
FIG. 3 illustrates the remotely reprogrammable observing device according to an embodiment herein.

FIG. 3 illustrates a detailed schematic diagram of a remotely reprogrammable observing device 104. The observing device 104 may be used to monitor the astronomical activity and be remotely reprogrammable based on broadcast data and user configurations. Also, the device 104 may capture astronomical images or images of an astronomical activity being observed.

A digital telescope 304 may be used to observe an astronomical activity and capture astronomical images. A microprocessor 302 may produce instructions for the digital telescope 304. The observing device 104 thus is reprogrammed to position the digital telescope 304 at a particular tilt angle, pan angle, etc. On positioning itself, the observing device 104 may capture the image upon receiving instructions for the same from the microprocessor 302. The broadcast data (transmitted from satellite 108 (of FIG. 1)) received at the antenna 306 may be transmitted to the data broadcast receiver module 316 for primary treatment. The primary treatment may include the removal of headers in the message to make it fit for further processing.

The decryption of the broadcast data may be provided by a unique apparatus identification and decryption processor module 318. The broadcast data may thus be interpreted by different observing devices 104a-104c (of FIGS. 1-2) based on different user configurations associated with each device 104a-104c. Also, a unique identification of the observing device 104a-104c may be provided to reprogram each device 104a-104c independent of each other.

The images captured may be saved with information regarding atmospheric data. External sensor ports 312 may be provided to couple atmospheric data sensors 162a, 164a, 166a-166c with the respective remotely reprogrammable observing device 104a-104c. Additionally, a global positioning system (GPS) receiver 322 may be provided in the observing device 104 to obtain GPS signals, and date and time data from a GPS satellite (not shown). This data may be provided to the microprocessor 302 for processing along with the astronomical activity and imaging information. A Bluetooth™ communication module 324 may be provided in the device 104 enabling easy transmission of information to any other electronic device (for example a portable electronic device such as a laptop computer, a cell phone, etc.).

Furthermore, a user interface 326 may be provided that allows easier reporting of an astronomical activity. The user interface 326 also provides a display of astronomical activity being observed or access to the stored astronomical activity and imaging information. A user may also be allowed to program the observing device 104 through the user interface 326. A wireless data module 314 may be provided to allow transmission of astronomical activity monitoring and imaging information to the server 106 (of FIG. 2) using wireless technology. To meet the requirement of powering the device 104 a power source 336 may be provided.

Figure 4:
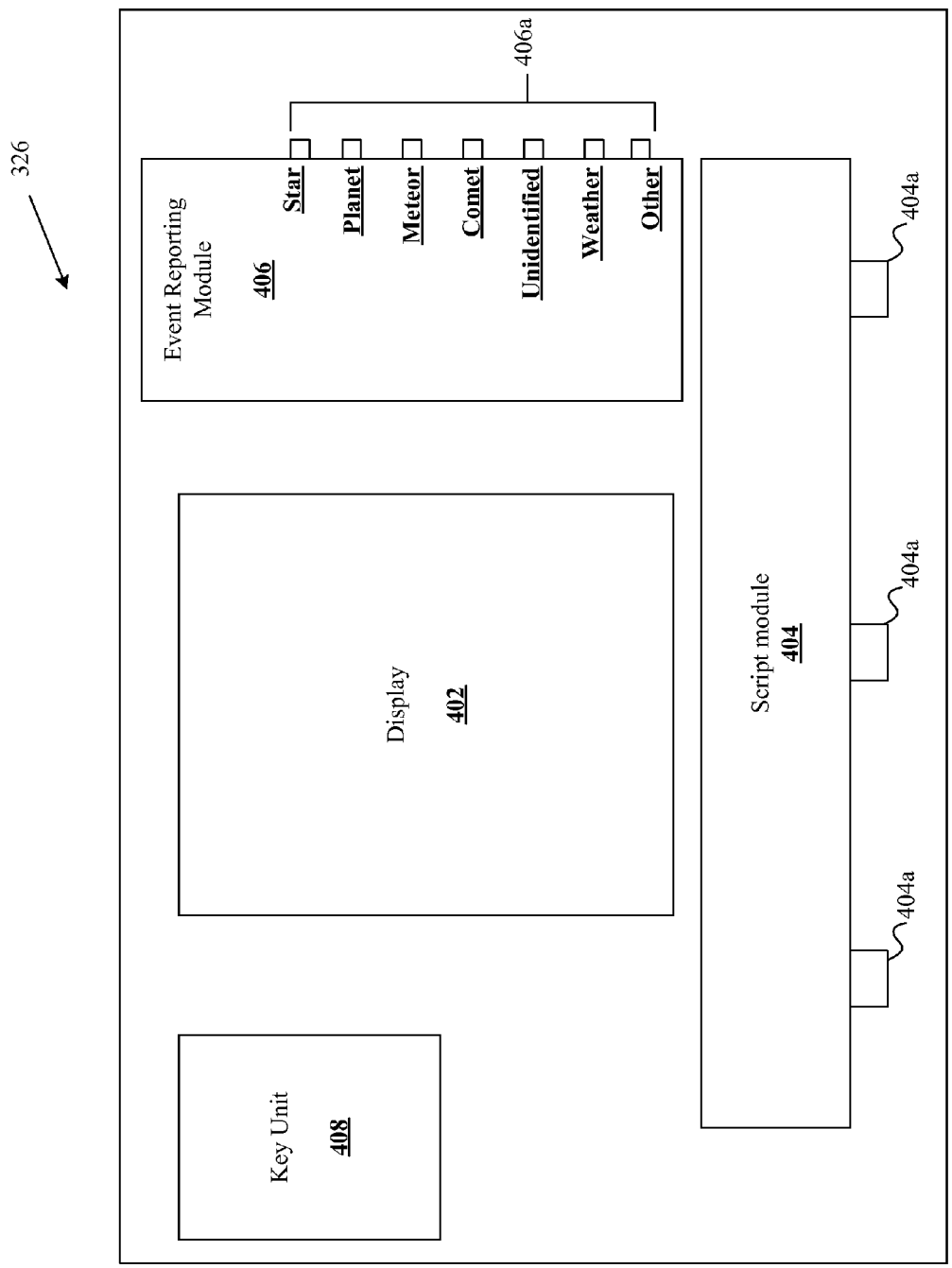
FIG. 4 illustrates the user interface according to an embodiment herein.

In one embodiment, the user interface 326 may be provided as shown in FIG. 4. The user interface 326 provides quick access to the functionalities provided by the observing device 104 (of FIG. 3). A display 402 allows astronomical images being observed by the digital telescope to be seen. Also, stored images may be seen on the display 402 as well. A key unit 408 may provide inputs for programming of the observing device 104.

An event reporting module 406 may be provided that may comprise buttons 406a associated with various standard astronomical events such as star, planet, meteor, comet, unidentified, weather, or other events. The user may press a corresponding button 406a to report an observed event. For example, if a user sees a comet, he/she may press the comet button to report its observation. This feature of the embodiment allows quick reporting of an event increasing the chances of an observed event being reported at the server 106 (of FIGS. 1-2). This further allows increased information being available at the server 106 thereby improving the overall efficiency of the system 100 (of FIG. 1).

Additionally, a script module 404 allows the user of the observing device 104 (of FIG. 3) to reply to a survey query that may be made available as a scripted query transmitted to the device 104 from the data broadcast. Script module buttons 404a allow the user to provide feedback as predefined answers, for example yes, no, next. For example, a user may be queried if a comet appeared at a given date. The user may reply with the help of Script module button yes and script module button no. For viewing the next query the script module button next may be pressed. The observing device 104 may accordingly transmit the reply to the server 106. The observing device 104 may also be allowed to confirm such an event by positioning itself based on the survey query. For example, upon receiving the information about an event with location, the observing device 104a-104c may align itself to view the location of the event and confirm such a happening.

Figure 5:
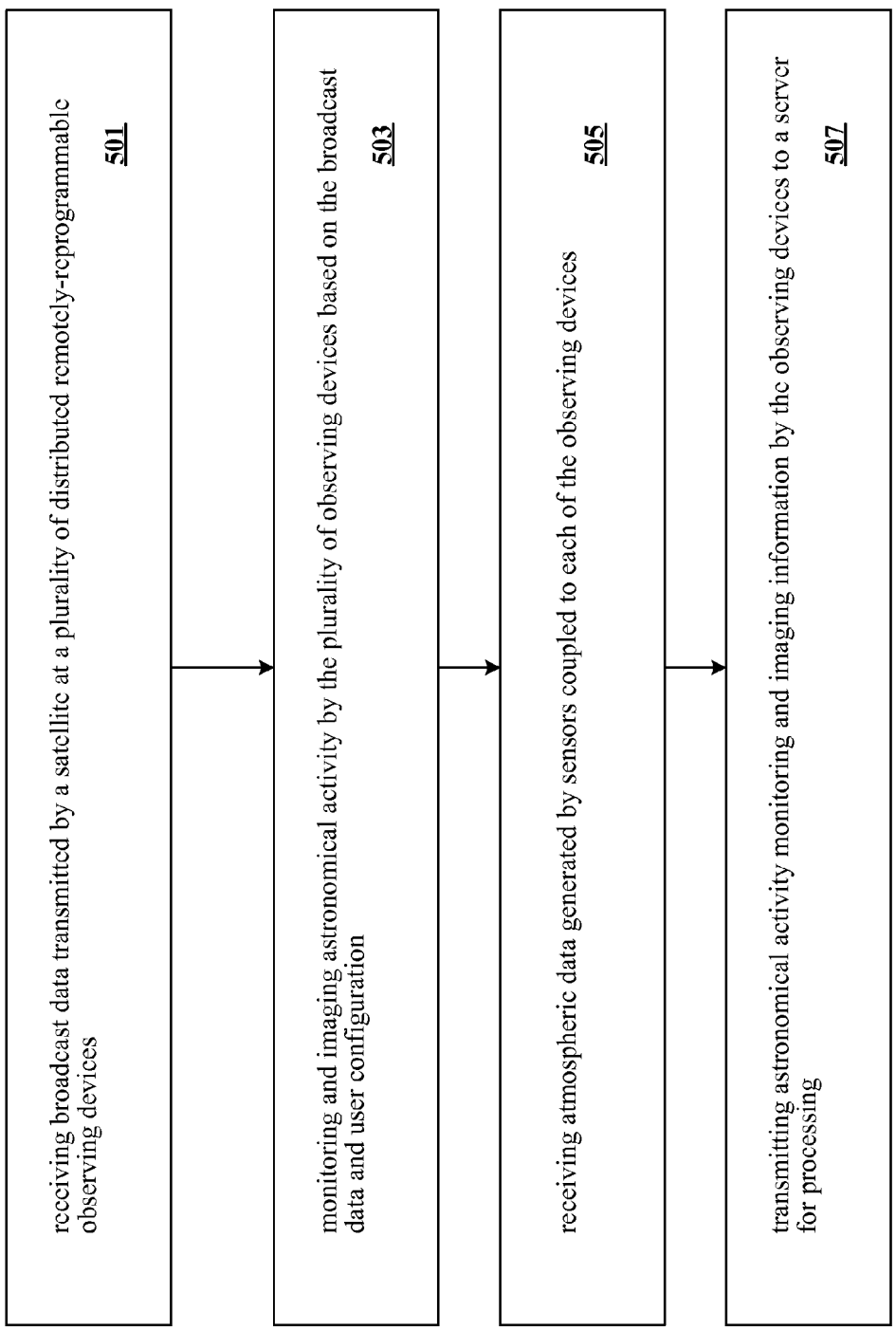
FIG. 5 illustrates the method of astronomical activity monitoring and imaging according to an embodiment herein.

A method for astronomical activity monitoring and imaging as per one embodiment is as shown in FIG. 5, with reference to the elements shown in FIGS. 1 through 4. The method allows efficient astronomical activity monitoring and imaging to various users who may be distributed over diverse geographic locations. Easy aggregation and utilization of astronomical activity monitoring and imaging information that may be available with each user is made possible. This allows increased usage of information available with individual users thereby increasing the reliability of their astronomical study.

The method may comprise the steps of receiving (501) broadcast data transmitted by a satellite 108 at a plurality of distributed remotely reprogrammable observing devices 104a-104c. The broadcast data received by the observing devices 104a-104c may comprise reprogramming instructions for the observing devices 104a-104c and scripted content to query or notify the user about new events. More particularly, the broadcast data may comprise reprogramming instructions for the plurality of distributed remotely-reprogrammable observing devices 104a-104c and scripted content to query or provide information regarding newly observed atmospheric events that relate to events of interest defined by a user configuration stored in the microprocessor 302. For example, the events of interest may include information regarding eclipses, comets, solar activity, etc. that a user indicates as being of interest to him/her, which is stored as an event of interest in the microprocessor 302. Then, upon the occurrence of such an event, the broadcast data automatically instructs the observing devices 104a-104c to transmit data, images, etc. pertaining to these events and then provides such data to a user in the form of queries or simply as received data.

Each observing device 104a-104c may have user configurations associated with it that may decide appropriate responses of the observing device 104a-104c to the broadcast data received by the observing device 104a-104c. The next step involves the monitoring and imaging (503) of the astronomical activity by the plurality of observing devices 104a-104c based on the broadcast data and user configurations. This allows users to control the use of their observing device 104 for surveys based on voluntary participation in a group or subscription to various services.

The next step involves receiving (505) atmospheric data from the sensors 162a, 164a, 166a-166c coupled to the observing devices 104a-104c, which enables providing enhanced information. Obtaining data regarding the atmospheric condition from the observing device 104 may further assist in astronomical studies by using this information for the processing of astronomical and imaging information received from that observing device 104. Recalibration of the astronomical activity and imaging information may also occur to reflect the atmospheric effect on the information been acquired.

The next step involves transmitting (507) the astronomical activity and imaging information by observing devices 104a-104c to a server 106 for processing to allow providing for the collection of information from various observing devices 104a-104c. Further processing and distribution of the improved information may be made possible by providing an interface with the server 106 through the World Wide Web.

In various embodiments herein the system 100 (of FIG. 1) and method (shown in FIG. 5) allows efficient astronomical activity monitoring and imaging to a various individual astronomers or researchers. More particularly, easy aggregation and utilization of astronomical activity monitoring and imaging information that may be available with each user is made possible. This allows increased usage of information available with individual users thereby increasing the reliability of their astronomical study. A user may also be allowed to easily change the configuration to restrict or allow the use of his/her observing device 104a-104c.

The foregoing description of the specific embodiments will so fully reveal the general nature of the embodiments herein that others can, by applying current knowledge, readily modify and/or adapt for various applications of such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. An astronomical activity monitoring and imaging system comprising:
    a satellite adapted to transmit broadcast data;
    a plurality of distributed remotely-reprogrammable observing devices adapted to receive said broadcast data by said satellite based on a user configuration comprising customized selections of events of interest;
    an atmospheric sensor adapted to provide atmospheric data and coupled to each of the observing devices; and
    a server adapted to receive astronomical activity monitoring and imaging information from said observing devices and transmit said broadcast data to said satellite for reprogramming of said observing devices,
    wherein said broadcast data comprises reprogramming instructions for said plurality of distributed remotely-reprogrammable observing devices and scripted content to query or provide information regarding newly observed atmospheric events that relate to said events of interest defined by said user configuration.

2. The system as in claim 1, wherein said observing devices comprise a digital telescope.

3. The system as in claim 1, wherein said atmospheric sensor is adapted to sense wind direction, temperature, and light receptivity.

4. The system as in claim 1, wherein said atmospheric sensor is adapted to sense atmospheric data that affects said astronomical activity monitoring and imaging information.

5. The system as in claim 1, wherein said server is adapted to recalibrate astronomical activity and imaging information based on atmospheric data.

6. The system as in claim 1, wherein said server is adapted to process said astronomical activity and imaging information obtained from one group of observing devices and transmit broadcast data to said satellite for reprogramming another group of observing devices.

7. The system as in claim 1, wherein said user configuration comprises accessibility settings of an observing device of a user.

8. The system as in claim 1, wherein said broadcast data comprises reprogramming instructions.

9. The system as in claim 1, wherein said broadcast data comprises survey queries generated by said server.

10. The system as in claim 1, wherein said observing devices wirelessly transmit said astronomical activity monitoring and imaging information to said server.

11. The system as in claim 1, wherein said server is adapted to process said astronomical activity monitoring and imaging information obtained from said observing devices to generate improved information.

12. The system as in claim 11, wherein said server is adapted to provide improved information using image interferometry.

13. The system as in claim 11, wherein said improved information is accessible by a remote service access device.

14. The system as in claim 13, wherein said remote service access device is coupled to said server through the World Wide Web.

15. A method for astronomical activity monitoring and imaging, said method comprising:
    generating a broadcast data for reprogramming of a remotely-reprogrammable observing device based on atmospheric data;
    receiving broadcast data transmitted by a satellite at a plurality of distributed remotely-reprogrammable observing devices;
    monitoring and imaging astronomical activity by said plurality of observing devices based on a user configuration comprising customized selections of events of interest;
    receiving the atmospheric data generated by sensors coupled to each of the observing devices; and
    transmitting the received astronomical activity monitoring and imaging information to a server for processing,
    wherein said broadcast data comprises reprogramming instructions for said plurality of distributed remotely-reprogrammable observing devices and scripted content to query or provide information regarding newly observed atmospheric events that relate to said events of interest defined by said user configuration.

16. The method as in claim 15, wherein said observing devices comprise a digital telescope.

17. The method as in claim 15, further comprising said sensors sensing wind direction, temperature, and light receptivity.

18. The method as in claim 15, further comprising recalibrating astronomical activity and imaging information based on atmospheric data.

19. The method as in claim 15, wherein said astronomical activity and imaging information obtained from one group of observing devices is processed to create broadcast data to said satellite for reprogramming another group of observing devices.

20. The method as in claim 15, wherein the user configuration comprises accessibility settings of an observing device of a user.

21. The method as in claim 15, wherein said broadcast data comprises reprogramming instructions.

22. The method as in claim 15, wherein said broadcast data comprises survey queries generated by said server.

23. The method as in claim 15, further comprising wirelessly transmitting said astronomical activity monitoring and imaging information from said observing devices to said server.

24. A reprogrammable apparatus for astronomical activity monitoring and imaging, said apparatus comprising:
   a microprocessor;
   a telescope adapted to position itself based on microprocessor instructions;
   an antenna adapted to receive broadcast data;
   a wireless data modem adapted to communicate with a server;
   at least one atmospheric sensor adapted to sense information on atmospheric parameters; and
   a user interface adapted to allow user inputs of replies to queries generated by said server,
   wherein said broadcast data comprises reprogramming instructions for said at least one atmospheric sensor and scripted content to query or provide information regarding newly observed atmospheric events that relate to events of interest defined by a user configuration stored in said microprocessor.

* * * * *